(12) United States Patent
Knudsen et al.

(10) Patent No.: US 9,391,490 B2
(45) Date of Patent: Jul. 12, 2016

(54) GEAR HOUSING OF LINEAR ACTUATOR WITH OPENING FOR POWER TAKE-OFF

(75) Inventors: Martin Kahr Knudsen, Sydals (DM); René Sørensen, Gråsten (DM); Anders B. Lorenzen, Åbenrå (DM)

(73) Assignee: Linak A/S, Nordborg (DK)

( * ) Notice: Subject to any disclaimer, the term of this patent is extended or adjusted under 35 U.S.C. 154(b) by 632 days.

(21) Appl. No.: 12/735,303

(22) PCT Filed: Jan. 9, 2009

(86) PCT No.: PCT/DK2009/000002
§ 371 (c)(1),
(2), (4) Date: Jul. 1, 2010

(87) PCT Pub. No.: WO2009/086831
PCT Pub. Date: Jul. 16, 2009

(65) Prior Publication Data
US 2010/0282008 A1    Nov. 11, 2010

(30) Foreign Application Priority Data

Jan. 12, 2008 (DK) .................................. 2008 00043
Jan. 12, 2008 (DK) .................................. 2008 00046

(51) Int. Cl.
*H02K 7/06* (2006.01)
*F16H 25/20* (2006.01)
*G01D 5/04* (2006.01)
*G01D 5/165* (2006.01)
(Continued)

(52) U.S. Cl.
CPC .............. *H02K 7/06* (2013.01); *F16H 25/2015* (2013.01); *G01D 5/04* (2013.01); *G01D 5/165* (2013.01); *G01D 5/2515* (2013.01); *H02K 7/1163* (2013.01); *F16H 2025/209* (2013.01); *F16H 2025/2084* (2013.01); *Y10T 74/18576* (2015.01)

(58) Field of Classification Search
CPC .................. F16H 2025/2087; F16H 2025/209; F16H 2025/2062; F16H 2025/2065
USPC ................. 74/89.23, 89.25, 89.27, 89.28, 11; 475/331, 332
See application file for complete search history.

(56) References Cited

U.S. PATENT DOCUMENTS 4,743,995 A * 5/1988 Castle et al. ................ 360/98.07
4,858,481 A * 8/1989 Abraham ...................... 74/89.38
4,966,045 A * 10/1990 Harney ........................ 74/424.96

(Continued)

FOREIGN PATENT DOCUMENTS

JP         2003322233        11/2003
WO    WO2007/037214    * 4/2007 .................... 74/89.23

OTHER PUBLICATIONS

English Abstract of JP2003322233.

*Primary Examiner* — William C Joyce
*Assistant Examiner* — Gregory Prather
(74) *Attorney, Agent, or Firm* — Dykema Gossett PLLC

(57) ABSTRACT

A linear actuator comprising a cabinet (1), an electric motor (2), a transmission (4), a gear housing (11), a spindle nut (6), a spindle (5), the actuator being furnished with an opening (20) in the gear housing (11), where a gear wheel power take-off (21) is accessible and may be equipped with optional equipment. The gear wheel power take-off (21) is constructed as a tooth gearing on a planetary wheel holder (16) in a planetary wheel and transfers a movement to the optional equipment, which is proportional to the movement of the spindle nut during its travel on the spindle.

13 Claims, 6 Drawing Sheets

Figure 1:
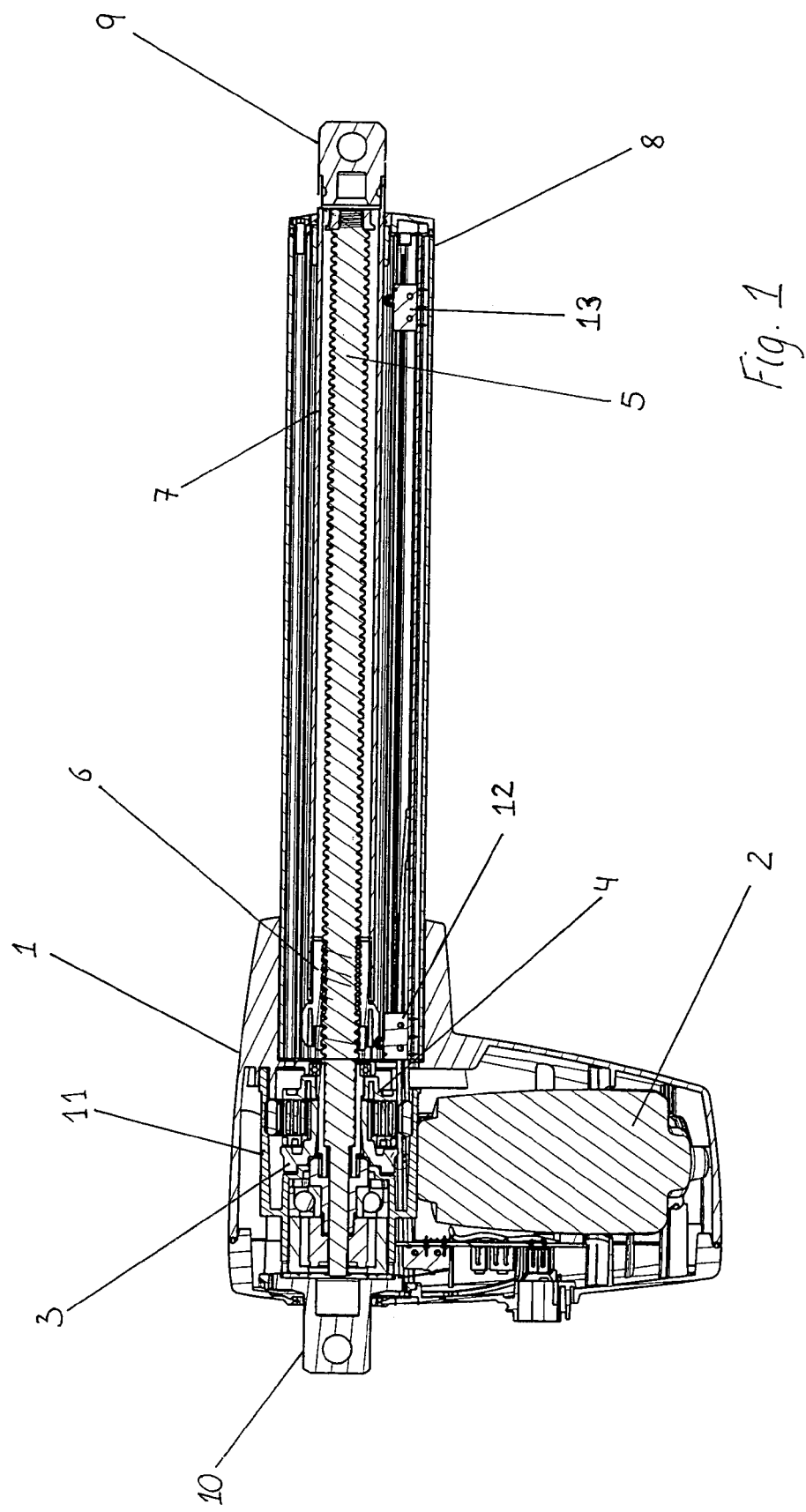

(51) Int. Cl.
*G01D 5/251* (2006.01)
*H02K 7/116* (2006.01)

(56) References Cited

U.S. PATENT DOCUMENTS

| | | | |
|---|---|---|---|
| 5,388,471 A | 2/1995 | DeCampos et al. | |
| 5,809,833 A * | 9/1998 | Newport et al. | 74/89.37 |
| 6,073,505 A * | 6/2000 | Yuda | 74/89.36 |
| 6,770,006 B2 * | 8/2004 | Abrahamsen | 475/343 |
| 6,772,655 B2 * | 8/2004 | Poehlau | 74/640 |
| 7,047,834 B2 | 5/2006 | Nielsen et al. | |
| 7,377,875 B2 * | 5/2008 | Shiina et al. | 475/339 |
| 7,896,768 B2 * | 3/2011 | Rauschenbach et al. | 475/72 |
| 7,932,473 B2 * | 4/2011 | Sorensen et al. | 200/61.41 |
| 7,971,937 B2 * | 7/2011 | Ishii et al. | 297/330 |
| 7,992,460 B2 * | 8/2011 | Bochen et al. | 74/424.76 |
| 7,998,009 B2 * | 8/2011 | Zhao et al. | 475/78 |
| 8,006,579 B2 * | 8/2011 | Kuribayashi et al. | 74/89.38 |
| 8,015,890 B2 * | 9/2011 | Christensen et al. | 74/89.38 |
| 8,024,987 B2 * | 9/2011 | Yamaguchi et al. | 74/89.23 |
| 8,215,241 B2 * | 7/2012 | Garneau et al. | 108/20 |
| 8,328,204 B2 * | 12/2012 | Puzio | 279/60 |
| 8,336,818 B2 * | 12/2012 | Flatt | 244/99.9 |
| 2005/0115343 A1 * | 6/2005 | Sakamaki | 74/89.23 |
| 2006/0011002 A1 * | 1/2006 | Rashleger | 74/89.23 |
| 2006/0037796 A1 * | 2/2006 | Naegeli | 180/205 |
| 2006/0196307 A1 * | 9/2006 | Radinger et al. | 74/640 |
| 2006/0205560 A1 * | 9/2006 | Meier | 475/331 |
| 2006/0264292 A1 * | 11/2006 | Plath | 475/162 |
| 2007/0111847 A1 * | 5/2007 | Inagaki et al. | 475/331 |
| 2007/0169578 A1 * | 7/2007 | Christensen et al. | 74/89.37 |
| 2008/0012522 A1 * | 1/2008 | Wiegers et al. | 318/638 |

\* cited by examiner

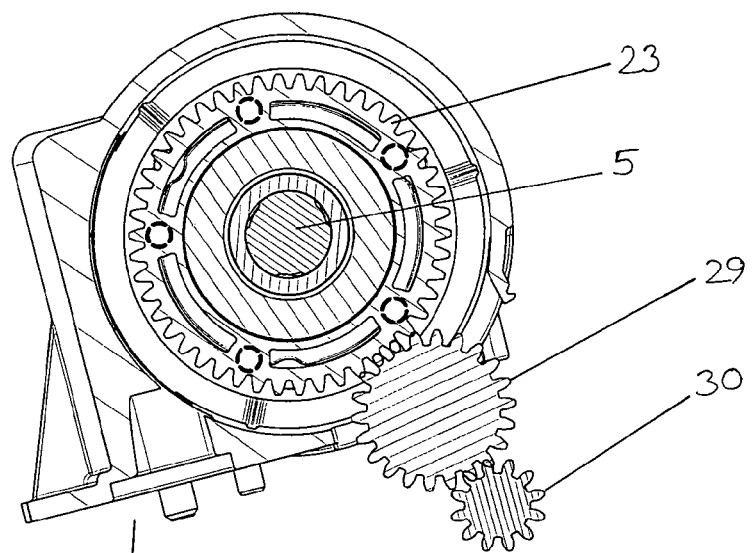
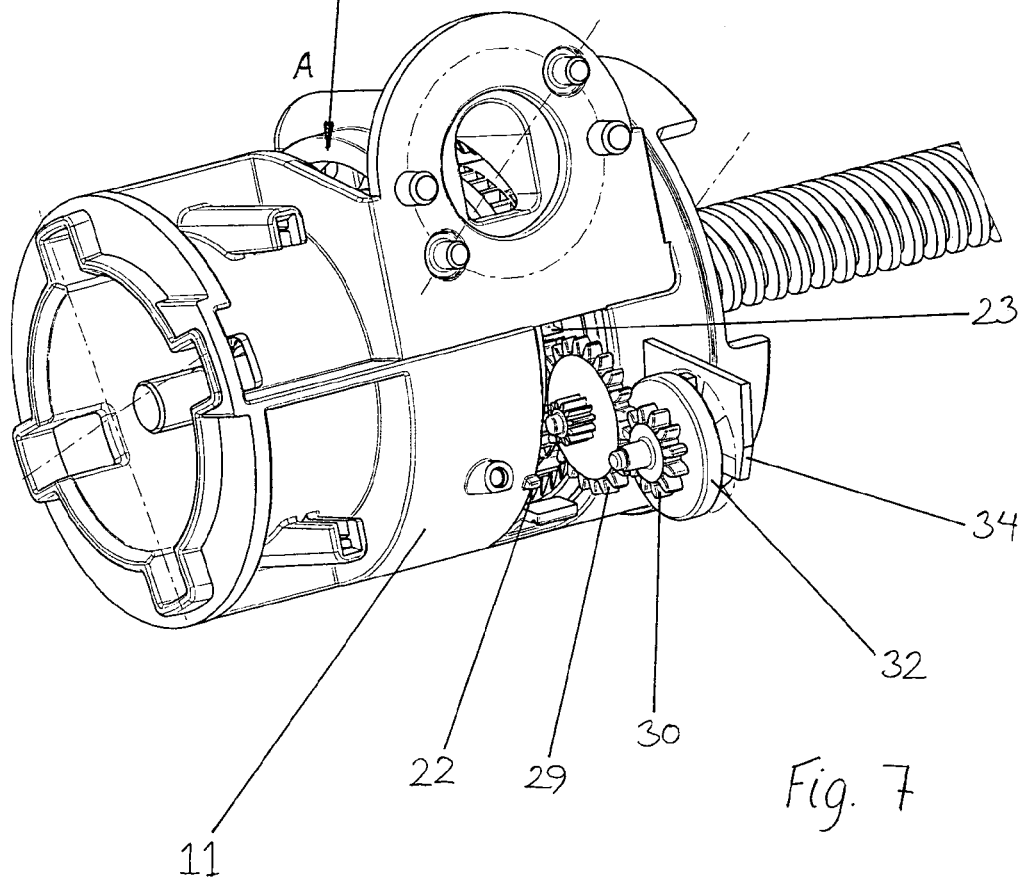
Fig. 8
Fig. 7

GEAR HOUSING OF LINEAR ACTUATOR WITH OPENING FOR POWER TAKE-OFF

BACKGROUND OF THE INVENTION

1. Field of the Invention

The invention relates to a linear actuator comprising a cabinet, an electric motor, a transmission, a gear housing, containing at least part of the transmission, a spindle, connected to the electric motor via the transmission, on which spindle is mounted a spindle nut.

2. The Prior Art

Linear actuators are widely used within many different areas, e.g. in connection with adjustable furniture, control systems, machines etc. Some of the qualities of a linear actuator are that it is maintenance-free, compact, sturdy and easy to install. Implicitly, these qualities also result in limitations in connection with adapting the actuator to the construction in which it is to be incorporated. It would often be expedient if the actuator, besides driving the spindle nut back and forth, could also be fitted with optional equipment. As an example of optional equipment may be mentioned a switch or a system for position determination of the spindle nut during its travel on the spindle.

EP 0 831 250 to Danaher Corporation discloses a linear actuator in which a rotary potentiometer is incorporated.

A rotary potentiometer is a fine way to equip an actuator with a system for position determination. However, a more flexible system could be desirable, as the potentiometer is deeply integrated in the construction, so that it is not immediately possible to replace or change over to other types of optional equipment.

SUMMARY OF THE INVENTION

The purpose of the invention is to provide a solution to the outlined problem, i.e., to achieve a greater flexibility in respect to the connection of optional equipment to a linear actuator. This is desirable when equipping the actuator with, e.g., a system for position determination, but also when replacing defective optional equipment, in order to obtain a better maintainability. As regards the production of the actuator as a unit, a more uniform production flow is desirable, which in the end in an easy and inexpensive manner may be adjusted to the wishes of the customer in that it in a simple manner is possible to mount optional equipment.

This is achieved according to the invention in that the transmission of the linear actuator is furnished with a gear wheel power take-off, which is available in an opening in the gear housing.

In a particularly expedient embodiment the transmission is a planetary gear, where the gear wheel power take-off is constructed as external teeth on a planetary wheel holder. This embodiment provides, as the planetary wheel holder has a relatively large diameter, possibility to obtain a high gear ratio between the optional equipment and the actuator. The solution is also simple in that an already existing planetary wheel holder is used for another purpose, i.e., the connection of optional equipment.

As regards the gear wheel power take-off, it may in another embodiment be constructed as external teeth on a sun wheel in the planetary gear. Due to the nature of the planetary gear, the gear ratio would here be smaller. The solution is still simple as an already existing sun wheel is used for another purpose, i.e., the connection of optional equipment.

In an embodiment the sun wheel is integrated with a worm wheel. In this way three functions are managed by one and the same component. This makes the construction simpler, more inexpensive and more compact while a large flexibility is achieved in connection with connection of optional equipment to the actuator.

The invention does not only relate to actuators where the transmission is a planetary gear, but also to actuators having a worm drive in which the worm wheel is secured to or on the spindle. Here, a worm wheel may be equipped with extra external teeth functioning as a gear wheel power take-off for connection of optional equipment. Again it is a simple construction where the worm wheel is used to manage another function.

In that a sensor system is located in a separate housing which may be mounted in connection with the gear housing in the actuator, the production of the actuator may be done in a particularly simple manner in that the actuator may be produced as a standard item, which is later equipped with a sensor system compliant with the wishes of the customer by equipping the separate housing with a sensor system on the actuator. A defective sensor system may in the same manner be easily replaced. For transferring a movement from the transmission of the actuator to the housing for the sensor system, the housing also comprises a gear wheel which is brought into mesh with the gear wheel power take-off in the opening in the gear housing. When the gear wheel in the gear wheel power take-off rotates, the movement is thus transferred to the sensor system.

In its most simple structure the position sensor may be a rotary potentiometer secured in the housing by snap locking means. The rotary potentiometer is furnished with a shaft on which a gear wheel may be mounted. The shaft of the potentiometer is secured in a holding arrangement, functioning as a slide bearing in that the potentiometer is snapped down over this. Moreover, guides are constructed in the housing in order to position the potentiometer housing, said guides being equipped with locking pins functioning as co-operative snap locking means with the potentiometer housing.

The gear wheel connected to the potentiometer shaft may either be directly connected to the gear wheel power take-off on the gear housing or connected to this via a gearing in the form of further gear wheels. Regarding a potentiometer of the multi-turn type, the gear ratio may be adjusted so that the number of rotations of the potentiometer shaft, corresponding to the dynamic range of the potentiometer, corresponds to the dynamic range of the spindle nut on the spindle between a first and a second point indicating the length of stroke.

The use of a gearing between the gear wheel, protruding from the housing for the sensor system, and the wheel, which drives the sensor system, is not limited to systems for absolute position determination like e.g. a potentiometer, but also applies to systems for incremental position determination.

An embodiment for an incremental system for position determination mounted in the housing is a magnet based sensor system constructed of both a pulse generator in the form of a magnet having at least one set of poles and at least one corresponding sensor in the form of a Reed-switch or a Hall-element.

Particularly expedient, the magnet is a ring magnet located in connection with the gear wheel protruding from the housing and is moved proportionally to this gear wheel. This is achieved in that the ring magnet is located on the same shaft as one of the gear wheels in the housing. The magnet is further located expediently relative to the sensor(s). In that the sensors are constructed on a printed circuit board located in guides for that purpose in the housing, is both ensured that these are placed in the right position relative to the magnet, but also that these are secured in the position. Further, there are great advantages in connection with the production of the housing with the sensor system, as all parts can be easily mounted in holding arrangements with mutually functioning snap locking means. If it is desired to replace a sensor system based on a Reed-switch with a sensor system based on a Hall-element, this can be done merely by replacing the printed circuit board with a printed circuit boards equipped with the desired sensor.

To calibrate the number of rotations of the magnet with the number of rotations of the spindle and thus express the travel of the spindle nut on the spindle at a predetermined number of pulses picked up by the sensor, the ring magnet is located parallel to a gear wheel, on the same shaft, which, in connection with the gear wheel protruding out of the housing, forms a gearing between the gear wheel take-off on the gear housing and the gear wheel located on the same shaft as the magnet. By means of a control in the form of a microprocessor the position of the spindle nut may be calculated.

As the sensor system is constructed in its own housing with an electrical connection, which is independent of the operation of the actuator, it is possible also to register a possible manual adjustment of the actuator e.g. by releasing a quick release function where the spindle is released from motor and gear, cf. e.g. WO 03/033946 to Linak A/S. However, this requires that the sensor system and control, if equipped, have been continuously supplied with power from before an initialization has taken place and until a read out of the position of the spindle nut on its travel on the spindle. This applies to all incremental systems for position determination. With regard to an absolute system for position determination in the form of a potentiometer, it is in the nature of the potentiometer not to be affected of whether the voltage at times has been cut off. When the potentiometer is read, typically by applying a voltage to this and reading out the voltage division on its terminals, it will appear as a reliable expression for the position of the spindle nut on the spindle.

The opening in the gear housing could with its structure by itself be used for securing the optional equipment in that the optional equipment is constructed to fit into the opening. Preferably, the surrounding parts around the opening in the gear housing and the optional equipment would be equipped with mutually functioning snap locking means and/or constructions to assemble the items which further may be secured by means of a fastening in the form of a screw or the like.

As it appears, the invention provides a solution which enables a simple and quick way to connect optional equipment to an actuator in that the optional equipment is merely by means of snap locking means and/or a fastening in the form of a screw on a gear wheel power take-off accessibly located on the actuator. The solution is simple as existing components in the actuator are modified with external teeth constituting the gear wheel power take-off. Moreover, the solution provides large flexibility in the production of the actuator as a standard item subsequently may easily be adapted to the requirements of the customer by connection of optional equipment.

BRIEF DERSCRIPTION OF THE DRAWINGS

Figure 2:
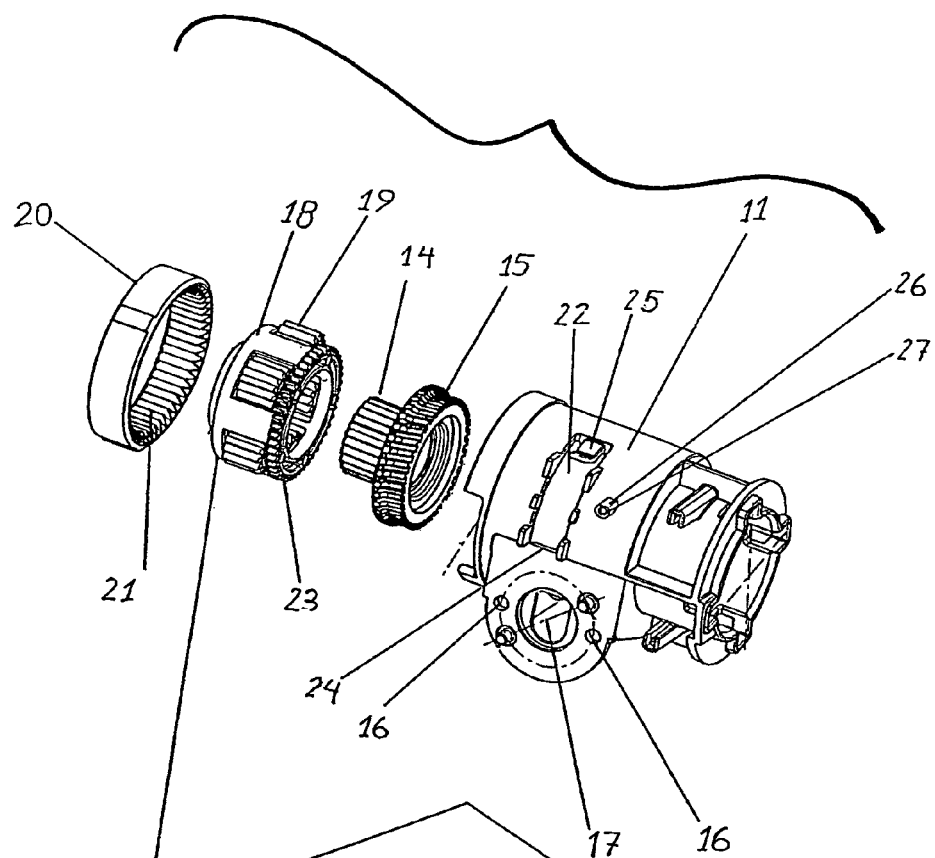
Figure 2:
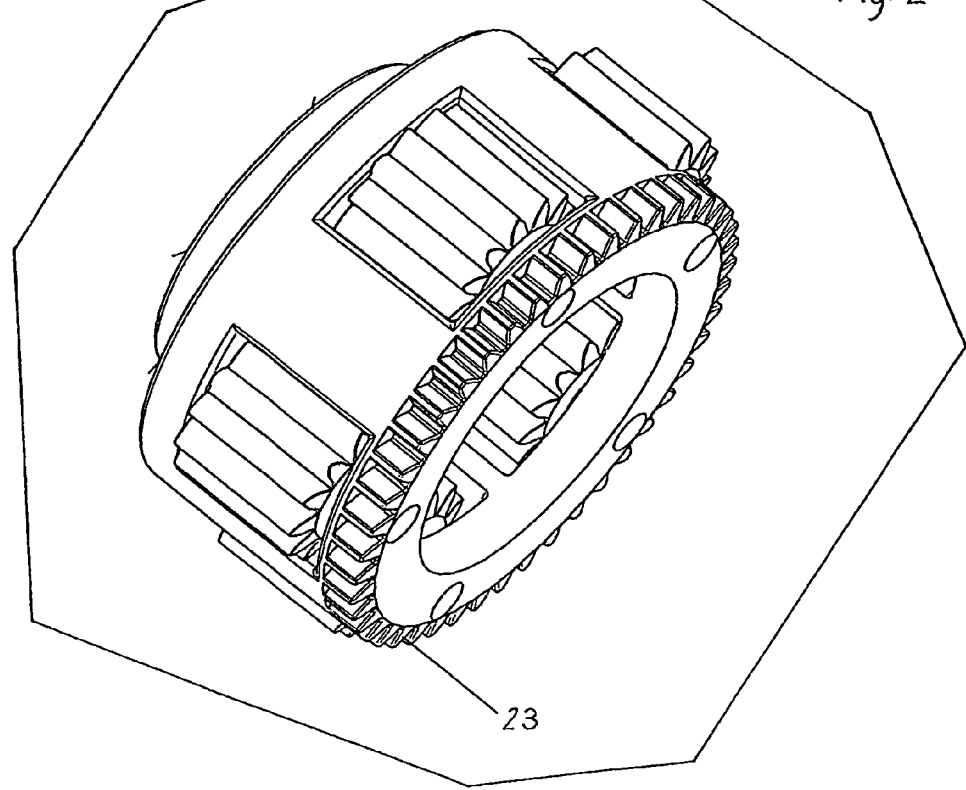
Figure 3:
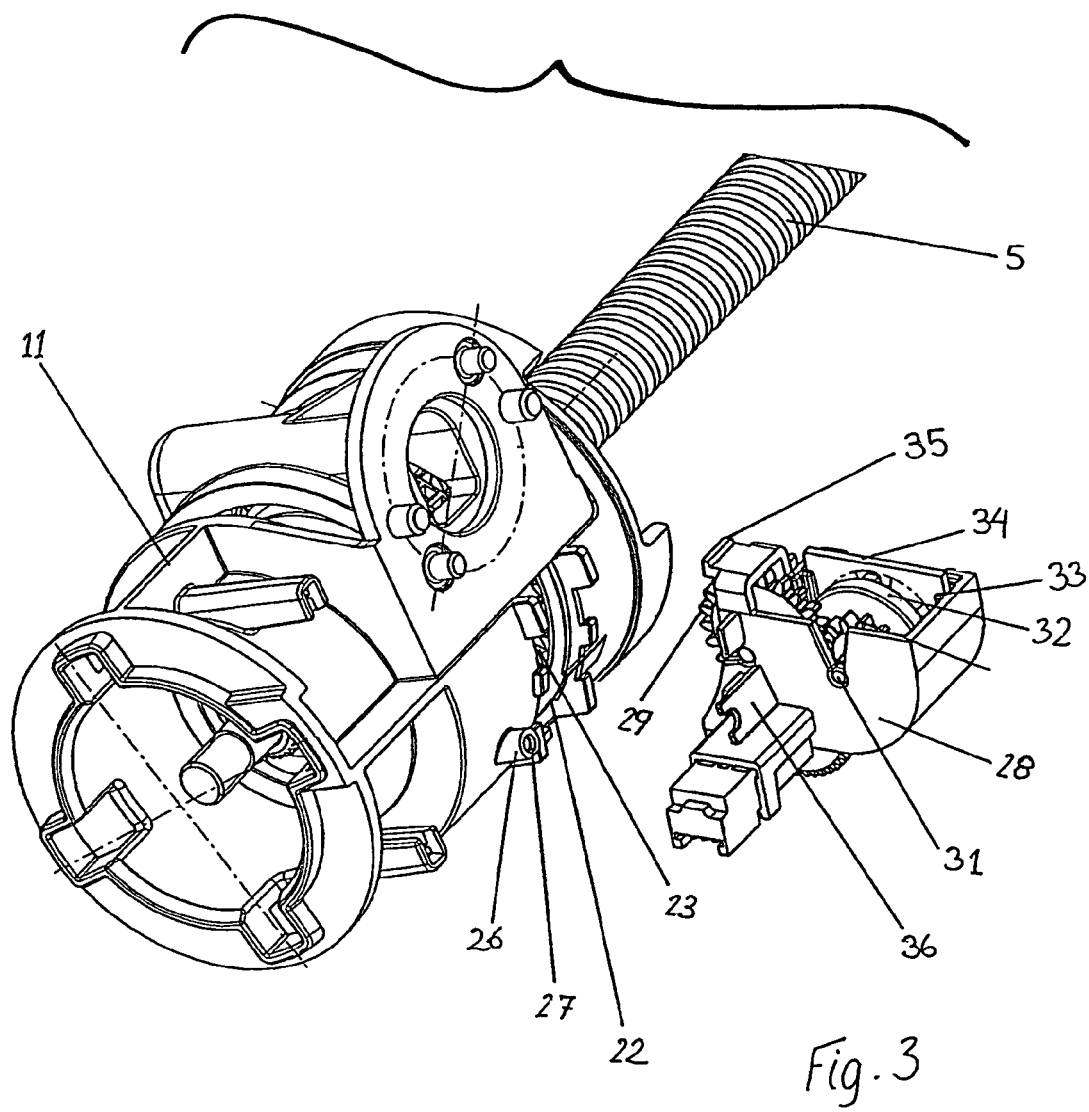
Figure 4:
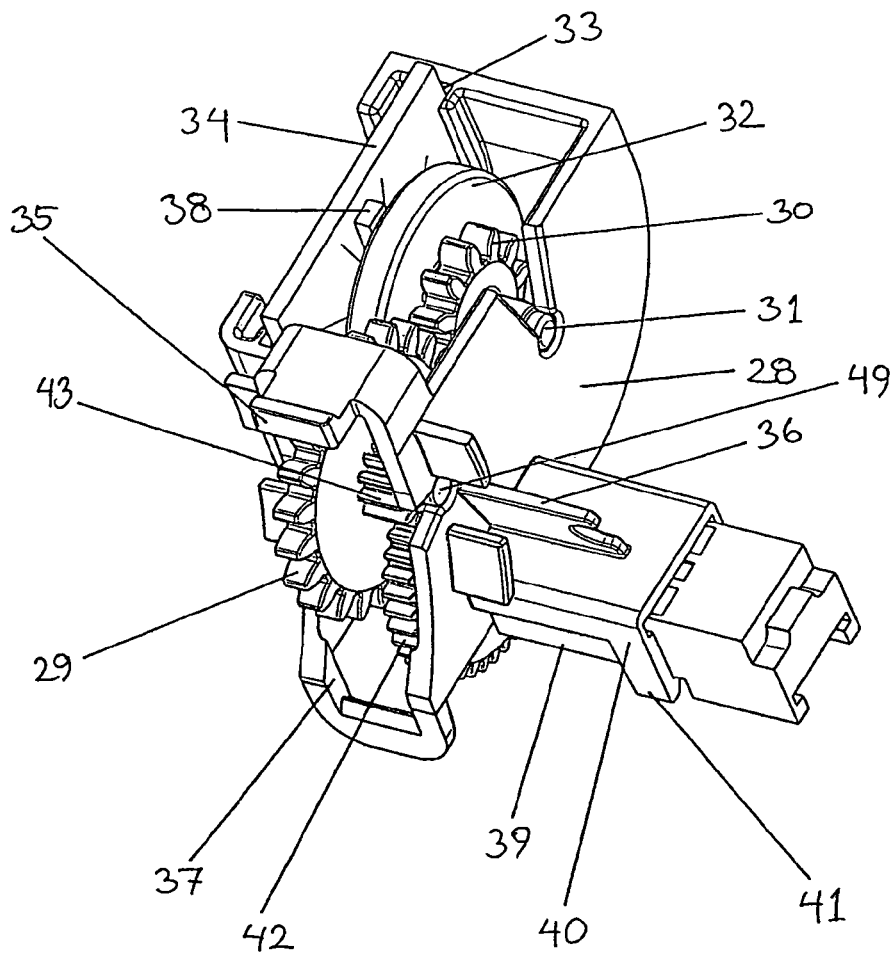
Figure 5:
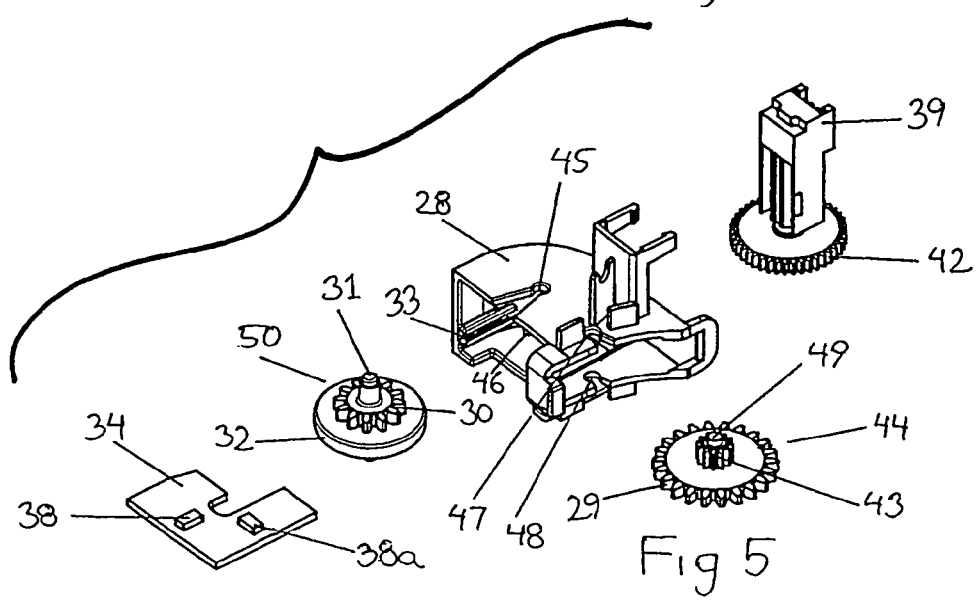
Figure 6:
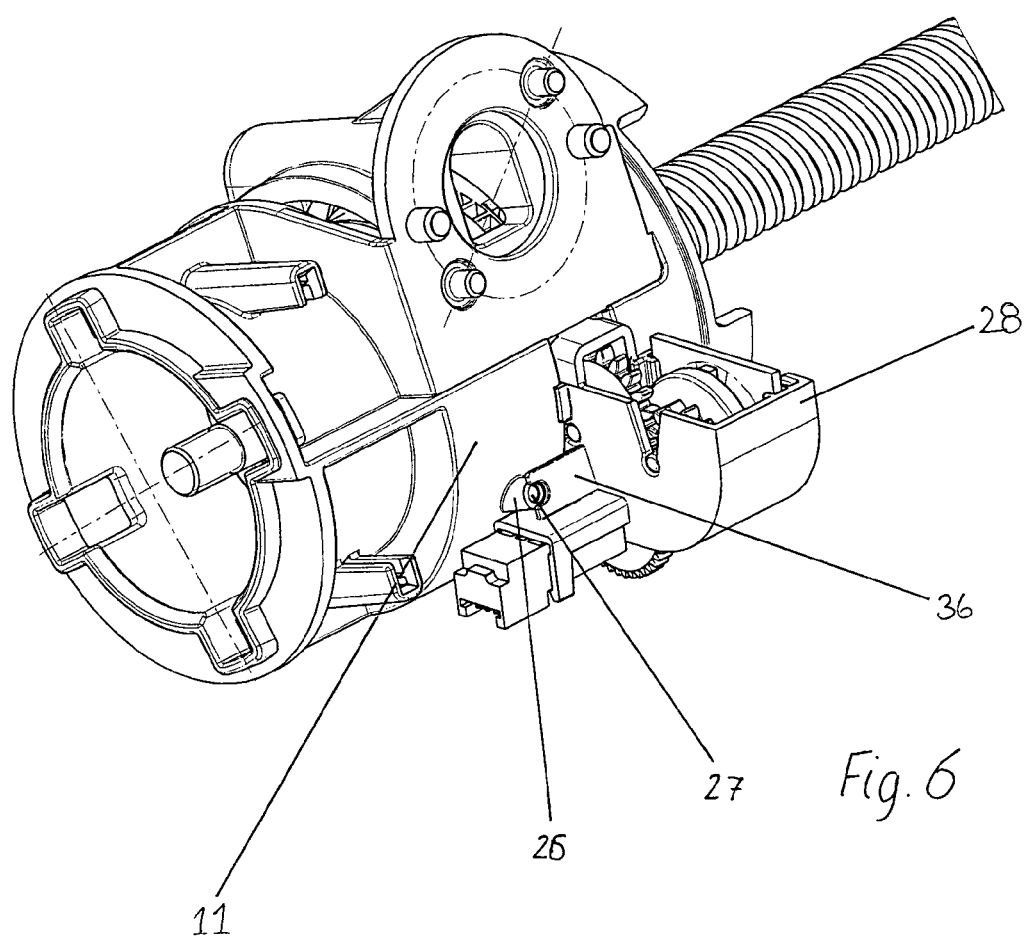

A linear actuator according to the invention will be described more fully below with reference to the accompanying drawings, in which FIG. 1 shows a longitudinal section through an actuator, FIG. 2 shows an exploded view of a gear housing and a planetary gear and a detailed view of the planetary wheel holder with external teeth, FIG. 3 shows a perspective view of the gear housing with gear wheel power take-off and optional equipment in the form of a sensor system, FIG. 4 shows a perspective view of the sensor system, FIG. 5 shows an exploded view of the sensor system, FIG. 6 shows a perspective view of the gear housing with sensor system, FIG. 7 shows a perspective view as in FIG. 6, but where the sensor system is shown without a housing, and FIG. 8 shows a cross section through the actuator in FIG. 7 at the arrow A.

DETAILED DESCRIPTION OF THE PREFERRED EMBODIMENTS

As it appears from FIG. 1, the main components of the actuator are composed of a cabinet 1 comprising a reversible DC motor 2, which over a worm drive 3 and a transmission 4 in the form of a planetary gear drives a spindle 5 with a spindle nut 6 on which is secured a tubular activation element 7 (inner tube) surrounded and controlled by an outer tube 8. The actuator is further equipped with a front mounting 9 at the front of the activation element 7 and a rear mounting 10 at the rear end of the housing 1.

FIG. 2 shows a gear housing 11 in the actuator, where the parts of the planetary gear are shown as exploded. The parts of the planetary gear consist of a sun wheel 14, with integrated worm wheel 15 in connection with a worm on the motor 2. In the drawing the motor and the worm are not shown, but the motor is mounted by means of screws in the holes 16 after that the worm of the motor has been lead through a hole 17 designed for that purpose in the gear housing 11, and the worm has been brought into mesh with the worm wheel 15 of the sun wheel. The planetary gear also comprises a planetary wheel holder (planetary gear carrier) 18 with planetary wheels 19 and a toothed rim 20 with internal teeth 21, adjusted to surround the planetary wheel holder 18. An opening 22 is constructed on the gear housing 11 where a gear wheel power take-off is accessible. Since the planetary gear in the drawing is not shown as mounted, the gear wheel power take-off is not visible in the opening. The gear wheel power take-off 23 is constructed as external teeth on the planetary wheel holder 18. The gear housing 11 and the parts of the planetary gear are adapted to each other so that the gear wheel power take-off 23, when the parts are assembled, is centered in the opening 22 in the gear housing 11. The opening 22 is also furnished with snap locking means in the form of an edge 24 and a pin 25, which together with counter parts on a housing for optional equipment form co-operative snap locking means. As it appears from FIG. 3, a tower 26 with a hole 27, in which a screw may be inserted for extra securing of the optional equipment is further constructed on the gear housing 11 opposite the opening 22. Incidentally, FIG. 3, shows the gear housing 11 with the planetary gear and a spindle 5 inserted, where the optional equipment in the form of a housing 28 with a system for position determination is shown opposite the opening 22. As it appears, the optional equipment is equipped with a gear wheel 29, constructed so that it fits into mesh with the gear wheel power take-off 23 in the opening 22 on the gear housing 11. As it appears from FIG. 4, the housing 28 for the optional equipment is equipped with snap locking means 35, 37, functioning as counter parts for the snap locking means 24, 25 constructed on the gear housing 11. A flange 36 is further constructed on the housing 28 for the optional equipment for extra securing of the housing 28 in connection with the gear housing 11 and the gear wheel power take-off 23 in that a screw may be placed in the hole 27 and secure the flange 36.

For position determination of the travel of the spindle nut on the spindle and thus the movement of the activation rod 7, the gear wheel power take-off 23 in the actuator is connected through the housing 28 for the sensor system via the gear wheel 29 to another gear wheel 30, where a magnet ring 32 is located on the same shaft 31. In a guide 33, a printed circuit board 34 is located. The printed circuit board is equipped with either a Reed-switch of a Hall-sensor 38 for detection of the number of rotations of the magnet ring 32. The number of rotations of the magnet ring 32 is proportional to the travel of the spindle nut 6 on the spindle 5. As the actuator is equipped with end stop switches 12,13 as shown in FIG. 1, the signals from these can be used to perform a calibration of the system for position determination. The end stop switches 12,13 are activated by the spindle nut 6 in its desired inner and outer end position. As the number of pulses over a movement of the spindle nut 6 over the distance is known, and the distance in the form of the length of stroke of the activation element 7 likewise is known, it is possible based on the number of rotations of the magnet ring 32 to express the position of the spindle nut 6 on the spindle 5 and thus the movement of the activation element 7. In order to determine which way the spindle nut 6 moves on the spindle 5, two Hall-sensors 38, 38a are mounted on the printed circuit board, mutually positioned at an angle. Depending on whether the magnet rotates one way or the other, the pattern, which the flanks in the measured signals from the sensors display, will indicate the direction of rotation.

The housing 28 is arranged to be equipped with either an incremental or an absolute system for position determination. Here, a system for absolute position determination consisting of a potentiometer 39 is described. A holding arrangement 40 is constructed on the housing 28, said holding arrangement being equipped with a locking pin 41. The holding arrangement receives and retains a potentiometer 39 of the multi-turn type. The potentiometer 39 is driven by a gear wheel 42 in mesh with another gear wheel 43, sharing a shaft with the gear wheel 29, which is in mesh with the gear wheel power take-off 23 on the actuator. The mutual dimensions of the gear wheels form a gearing, which adapts the dynamic range of the potentiometer to be able to cover a movement of the spindle nut 6 over the entire length of stroke of the spindle 5. By using a potentiometer 39, it will always be possible to achieve an absolute expression of the position of the spindle nut 6 on the spindle 5 and thus the movement of the activation element, even though the current for the actuator and the control has been cut off and the actuator has been adjusted manually, e.g., by releasing a quick release function, where the spindle released from motor and gear.

In FIG. 5 an exploded view of the sensor system is shown to make it easier to identify each part in the system. The housing is furnished with means in the form of slide bearings 45, 46, 47, 48 or receiving the shafts 31, 49 on the separate gear wheels 44, 50 and thus retaining them in the housing. As it appears, a central part is the gear wheel 44 with the two gear wheels 29, 43. The gear wheel 29 is the gear wheel, which is driven by the gear wheel in the gear wheel power take-off 23 on the gear housing 11 and transfers the movement to the sensor system. The gear wheel 29 also directly drives the ring magnet 32 by being directly connected to the gear wheel 30 that is, if this gear wheel 50 and the printed circuit board 34 with Hall sensors 38 are mounted. If it is not desired to incorporate such an incremental system for position determination in the actuator, this may freely be omitted and, e.g., instead incorporate an absolute system for position determination by mounting the gear wheel 44, which via the gear wheel 42 drives the potentiometer 39. This construction is practical as the housing 28 thus supports both systems, at once or separately.

FIG. 6 shows the gear housing 11 of the actuator where a housing 28 for optional equipment in the form of a system for position determination is received and held in the port 22 for the gear wheel power take-off 23.

FIG. 8 shows a cross section through the gear housing 11 of the actuator where the housing 28 for the sensor system is mounted. Here, it appears that the gear wheel power take-off 23 is the external teeth on the planetary wheel holder 18. The spindle 5 is mounted in connection with the planetary wheel holder 18, so that a rotation of the spindle 5 is also a rotation of the planetary wheel holder. The relation between the rotation of the spindle and the number of pulses given by a pulse generator, i.e. the rotation of a potentiometer shaft, is thus determined by the gear ratio between the toothed rim of the gear wheel power take-off 23 and the gear wheels connecting the sensor system to the gear wheel power take-off 23. In the example shown the toothed rim of the planetary wheel holder, which is the gear wheel power take-off 23, is equipped with forty-six teeth. The gear wheel 29 has twenty-two teeth where the gear wheel 30, which shares the shaft 31 with the magnet ring 32, has twelve teeth. This corresponds to that the magnet ring 32 rotates 3.83 times for each rotation of the spindle 5. As the magnet ring 32 is equipped with eight poles, it will create four pulse trains per rotation, which adds up to 15.33 pulses per rotation. Two Hall sensors 38, 38a are mounted on the printed circuit board 34, and the angular distance between these is adapted so that the flanks of the signals do not occur at the precise same moment. It will thus be possible to determine which way the spindle nut 6 rotates on the spindle 5. With the sensor system it is therefore possible to map and calibrate the dynamic range of the spindle nut 6 over the length of the spindle 5. Practically, this is done by moving the spindle nut 6 along the entire length of the spindle 5 between the two end stops 12, 13 and counting the number of pulses given by the sensor system over the distance. From a reference point, typically an end stop 12, 13, the value of the counter, thus, at any time gives an expression for where the spindle nut 6 is located on the spindle 5.

For a gearing to an absolute position determination element like, e.g., a potentiometer of the multi-turn type, it correspondingly applies that the number of rotations of the potentiometer over the full scale from one end point to another must be adapted to the number of rotations of the spindle when moving the spindle nut 6 from one end point to another, with an appropriate gearing.

As regards the incremental sensor system, is operates completely independent of the electrical system and operation of the actuator and is only driven mechanically by the actuator, which is why a manual operation of the actuator also would be registered by the sensor system, if this is equipped with a continuous power supply. Contrary to the solution with the absolute system for position determination using the potentiometer 39, the incremental system for position determination requires a calculation unit, typically a microprocessor, for calculating the position. The calculation unit is typically located in the housing for the control and is thus an extern part for the actuator, but the calculation unit may alternatively be incorporated in the actuator and via an appropriate interface be capable of communicating the position of the spindle nut on to other units in the system. The system should further be calibrated by performing an initiation process, which maps counting values relative to the dynamic range of the spindle nut 6.

Even though a Hall sensor is used as position sensor in the embodiment concerning the incremental system for position determination, it does not exclude the use of other technologies for determining the number of rotations of the spindle, constructed in the same modular form. As an alternative an optical sensor and a taco disk may be used.

It should be noted that even though the embodiment only describes the connection of a system for position determination in a gear wheel power take-off on the actuator, the invention also covers connection of other optional equipment to the power take-off. It might be that a power take-off directly or via a gearing drives a secondary spindle or spindle nut. The movement from the power take-off may e.g. be moved via a flexible shaft to the place on the bed where the function should be performed. The purpose could here be to perform an adjustment of a further mechanical part synchronous to the movement of a lying surface. This could be to adjust and thus possibly move e.g. a table top, a control unit, a display, a holding arrangement for mechanical equipment or other equipment. It could thus be ensured that this does not get in the way of the movement of the lying surface, or merely that it assumes a more ideal position relative to the patient. Another example of optional equipment could be equipment, which, analogous to the adjustment of the lying surface, shows the position of the spindle nut on a mechanical or electronic scale.

The term "microprocessor", used in the description, covers any unit, capable of meeting all the requirements for data processing of the described process performed by the microprocessor mentioned in the description.

A linear actuator is described above where the spindle nut moves the activation element but the invention also applies to linear actuators where the spindle nut is driven by an electric motor so that the spindle performs an axial movement.

The invention claimed is:

1. A linear actuator comprising:
a gear housing,
an electric motor attached to the gear housing,
a spindle which extends into the gear housing and which includes a spindle nut, and
a transmission in said gear housing which interconnects the electric motor with the spindle, said transmission comprising a planetary gearing comprising a planetary gear and a planetary gear carrier with external teeth, and said gear housing defining an opening through which additional equipment can extend to connect with and be driven by said external teeth.

2. The linear actuator according to claim 1, including additional equipment constructed as a separate unit comprising a housing and a gear wheel protruding through the housing and wherein the housing is mounted in connection with the opening in the gear housing so that the gear wheel may be brought into mesh with the external teeth through the opening in the gear housing.

3. The linear actuator according to claim 2 wherein the housing comprises a position sensor in the form of a potentiometer secured in the housing by snap locking means.

4. The linear actuator according to claim 3, wherein the potentiometer is equipped with a gearing between the external teeth on the actuator and a shaft on the potentiometer, said gearing being adjusted so that a dynamic range of the potentiometer corresponds to a dynamic range of the spindle nut on the spindle between a first and a second point indicating length of stroke.

5. The linear actuator according to claim 2, wherein the gear wheel protruding through the housing is connected to the sensor system via at least one gear wheel.

6. The linear actuator according to claim 2, wherein the housing comprises a position sensor in the form of a pulse generator and at least one corresponding sensor, wherein the pulse generator is a magnet with at least one set of poles and the corresponding sensor is a Reed-switch or a Hall-element.

7. The linear actuator according to claim 6, wherein the magnet is a ring magnet located in connection with a gear wheel and is moved proportional to the gear wheel.

8. The linear actuator according to claim 6, wherein the sensor is mounted on a printed circuit board located in guides in the housing.

9. The linear actuator according to claim 7, wherein the ring magnet is positioned parallel to a gear wheel on a common shaft, which in connection with the gear wheel forms a gearing between the gear wheel power take-off on the gear housing and the gear wheel located on the shaft as the magnet, and thus calibrates the number of pulses given by the sensor relative to the travel of the spindle nut on the spindle.

10. The linear actuator according to claim 6, wherein the sensor operates electrically independent of an electrical system of the actuator and thus also registers a manual adjustment of the activation element of the actuator.

11. The linear actuator according to claim 2, wherein the housing is mounted over the opening in the gear housing and is secured by snap locking means and/or at least one screw.

12. The linear actuator according to claim 11, wherein said gear wheel includes peripheral teeth which are engaged with said external teeth.

13. The linear actuator according to claim 12, wherein said opening is generally rectangular.

* * * * *